(12) United States Patent
Simmonds

(10) Patent No.: US 6,476,585 B1
(45) Date of Patent: Nov. 5, 2002

(54) BATTERY CHARGER

(76) Inventor: Neil S. Simmonds, 3306 Lancaster Ct., Coquitlam, British Columbia (CA)

( * ) Notice: Subject to any disclaimer, the term of this patent is extended or adjusted under 35 U.S.C. 154(b) by 0 days.

(21) Appl. No.: 09/786,705

(22) PCT Filed: Sep. 3, 1999

(86) PCT No.: PCT/CA99/00805

§ 371 (c)(1), (2), (4) Date: Mar. 5, 2001

(87) PCT Pub. No.: WO00/14848

PCT Pub. Date: Mar. 16, 2000

(30) Foreign Application Priority Data

Sep. 3, 1998 (CA) ............................................. 2246579

(51) Int. Cl.[7] ............................... H02J 7/14; H02J 7/00
(52) U.S. Cl. ........................................ 320/162; 320/134
(58) Field of Search ................................. 320/134, 162, 320/163, 164

(56) References Cited

U.S. PATENT DOCUMENTS 5,686,815 A * 11/1997 Reipur et al. ............... 320/116
5,998,968 A * 12/1999 Pittman et al. ............. 320/130

* cited by examiner

Primary Examiner—Gregory J. Toatley, Jr.
(74) Attorney, Agent, or Firm—Robert H. Barrigar

(57) ABSTRACT

A charging circuit and method for charging a lithium-ion cell or battery at a charging voltage that is varied during the charging of the cell or battery from a selected minimum charging voltage to a predetermined maximum charging voltage. The charging circuit includes a transformer for transforming line voltage applied to the primary winding thereof to a lower AC secondary winding voltage, the transformer being selected to limit secondary winding output current when the charging voltage is not less than the selected minimum charging voltage to a value not exceeding a selected upper limit for the lithium-ion cell; a rectifier sub-circuit connected to the secondary winding of the transformer for rectifying the secondary winding voltage; and a charge-voltage regulator sub-circuit connected to the rectifier sub-circuit for receiving the rectified secondary winding voltage and providing an output charging voltage that is limited to the predetermined maximum charging voltage.

29 Claims, 5 Drawing Sheets

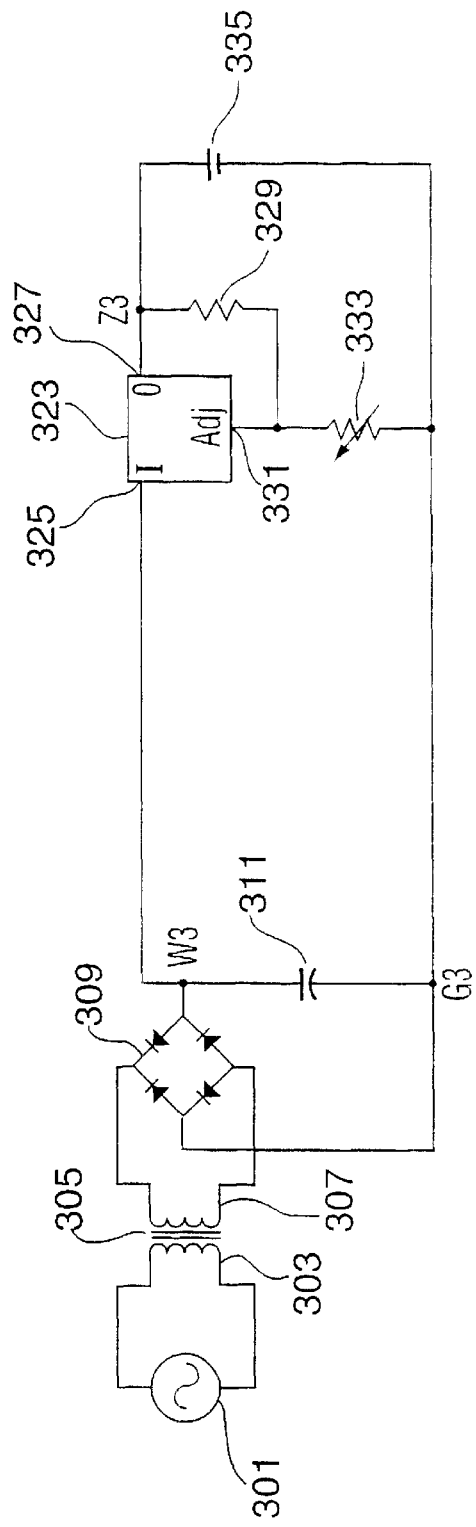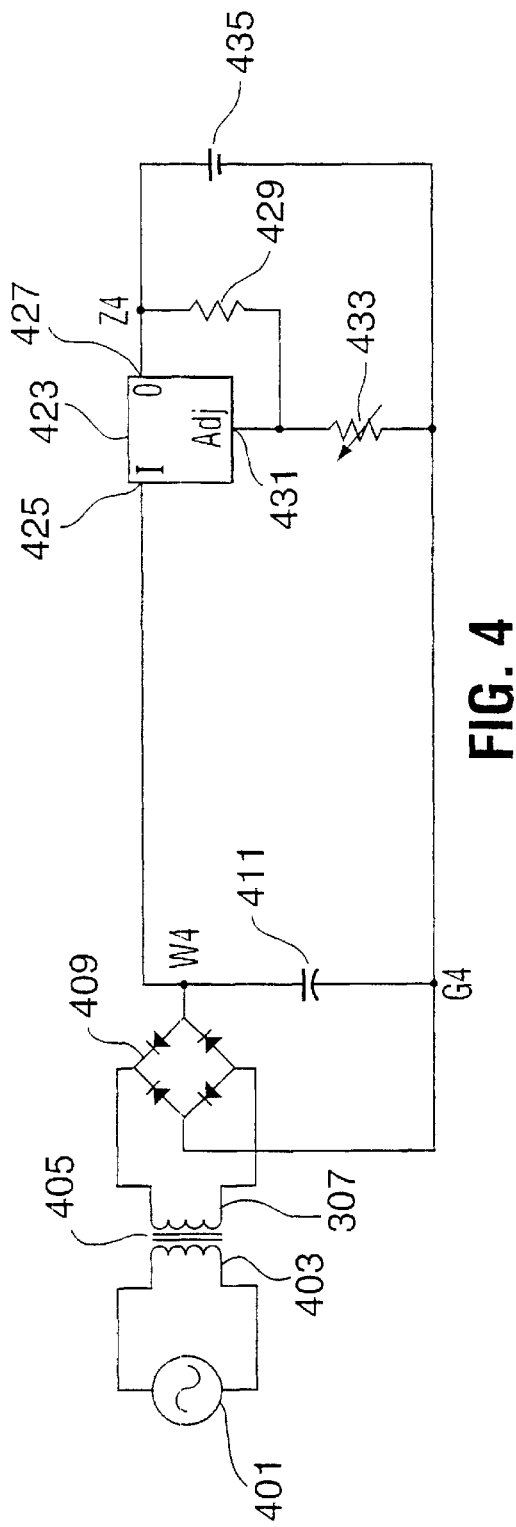

BATTERY CHARGER

FIELD OF THE INVENTION

This invention relates to the field of devices and methods for charging lithium-ion cells (or batteries) and specifically to a charging circuit including a power transformer in which the loading curve of the power transformer is used to limit the current flow to the lithium-ion cell (or battery) and a method for charging lithium-ion cells (or batteries) in which the loading curve of a power transformer is used to limit the current flow to the lithium-ion cell (or battery).

BACKGROUND OF THE INVENTION

Lithium-ion cells are used in battery packs where high energy density and low weight are required. However, lithium-ion cells can be dangerous if operated outside of their rated specifications. Typically, such batteries are used in controlled environments and are accompanied by suitable protective devices to prevent such problems as short circuits, unduly high temperatures and over-discharge. A number of such protective devices are typically installed in the battery pack. It is standard industry practice that lithium-ion cells are equipped with in-pack circuitry that provides the necessary protection for the cell in use. Although the in-pack circuitry will provide over-all protection, suitable cell charging circuitry is required to provide repeated charging of the cell while satisfying applicable charging and operational constraints that vary somewhat from one cell type to another, as the manufacturer may have specified for any given design.

Particularly, lithium-ion cells carry a risk of generating excess gas due to overcharge or overdischarge—this may cause the safety vent of the battery pack Lo open and release electrolyte into the atmosphere. If this release of electrolyte is continued, the cells can lose sufficient electrolyte that they are disabled. Further, overcharge or overdischarge may generate excess heat, causing a severe rise in temperature that can reduce the ability of the cell to retain energy and reduce the number of charging cycles the cell can undergo before it must be replaced. More seriously, overcharging or overdischarging may occur to such an extent that the lithium metal is isolated from the other elements and may become plated onto one of the electrodes. Lithium metal is explosive in water and will, in varying degrees, react with the moisture in the atmosphere. Lithium-containing batteries have been known to catch fire, although more recent safety designs have reduced the chances of this occurrence. The avoidance of overcharge voltage and overcharge current during charging of a lithium-ion cell is therefore an important objective in the use of lithium-ion cells, has been achieved by a number of known regulator circuits, and is also a principal objective of the present invention.

It is known that the attained charge capacity of a lithium-ion cell is significantly reduced if the charging voltage is less than the manufacturer's recommended maximum charging voltage (say 4.1 volts). With a drop of charging voltage of only 0.05V (approximately 1%), a loss of up to 5% in charge capacity occurs. However, if the charging voltage reaches only 4.0 volts (a drop of 0.1V or approximately 2%) then a loss of charge capacity of up to 12% occurs. On the other hand, as pointed out previously, if one exceeds the manufacturer's recommended maximum charging voltage, the life cycle of the cell is decreased, or worse, catastrophic breakdown of the cell can occur. Therefore one is compelled by these combined constraints to charge the lithium-ion cell at a voltage (at least at the end of the charging cycle) that is as close as reasonably possible to the maximum charging voltage without exceeding it.

Previous battery charging circuits for lithium-ion cells or batteries are known that include suitable regulator devices to maintain charging voltage and current within acceptable constraints. The "charge inhibition voltage" refers to the value that the cell manufacturer has set as the upper limit of operating/charging voltage of the cell. If the voltage exceeds this value, lithium metal may become plated to an electrode, with potentially dire consequences as discussed above. The "maximum charging voltage" is also established by the manufacturer at a lower value than the charge inhibition voltage; if for example the charge inhibition voltage is 4.35 volts for a representative cell, the maximum charging voltage is typically set at about 4.1 or 4.2 volts. Lithium-ion cell manufacturers have found that operation above the maximum charging voltage tends to reduce severely the recharging life cycle of the battery. Accordingly, in order to ensure that charging voltage is no greater than the set maximum charging voltage for the cell, controlled lithium-ion cell charging circuits typically provide a maximum output charge voltage that is no more than the maximum charging voltage.

In a typical charging circuit, an alternating current source operating at line voltage (typically 110–120 volts in North America) is applied to the primary winding of a transformer whose secondary winding applies a relatively low AC voltage to a bridge rectifier. The output of the bridge rectifier is applied across a smoothing capacitor to the load (the load in the charging circuit is the lithium-ion cell or battery to be charged). If no circuit elements were present other than the foregoing, the output voltage delivered to the lithium-ion cell would be at risk of exceeding the maximum charging voltage and ultimately might exceed the charge inhibition voltage of the lithium-ion cell. Accordingly, interposed between the bridge circuit and the lithium-ion cell or battery is a regulator circuit for limiting the voltage and current applied to the lithium-ion cell or battery during the charging operation.

A general purpose battery charger is described in U.S. Pat. No. 3,736,490 (Fallon et al.). This patent describes a battery charger incorporating a high leakage transformer and multiple rectifiers for regulating the charge current and the charge voltage applied to a battery. The high leakage transformer is used to provide impedance isolation between the input and the output circuit of the transformer and thus to protect the semiconductor components from line transients. The transformer is selected for maintaining a trickle charge current to the battery after a controlled rectifier providing supplemental current to the battery has been cut-off.

Another charging device defining the general state of the art is described in the abstract of Japanese Patent publication no 07296854 (Mitsui). The abstract describes a device for charging a battery that includes a constant current generator for charging the battery at a constant current at the initial stage of charging, and a constant voltage generator for performing constant voltage charging after a predetermined charging voltage has been reached.

Two types of regulator circuit are conventionally used, both of which are constant current/constant voltage regulator circuits, viz a linear regulator circuit, and a switching regulator circuit.

A switching regulator circuit includes a specially-designed charge control integrated circuit (IC) device for use with the other circuit elements. Such IC device is connected within the switching regulator circuit in constant-current mode. With the regulator operating in constant-current mode, charging continues at a constant current until the voltage across the lithium-ion cell or battery reaches the pre-set maximum charging voltage. The circuit then limits the output charging voltage to the maximum charging voltage, using a pulse-width modulation technique. According to this technique, the length of time that charge current is applied to the lithium-ion cell load during each AC. cycle is progressively and gradually decreased as charging proceeds.

The commercially available Benchmarq™ model bq2054 IC device and the 4C™ Technologies 4C-101656Li device are representative examples of charge control IC elements for use with a switching regulator circuit of the type described above.

As an alternative to the switching regulator, the principal other previously known regulated lithium-ion cell charging circuit includes a linear regulator incorporating a pair of suitable linear regulator charge control IC devices, one such device being connected within a charge current regulation subcircuit of the overall charging circuit, and the other within a charge voltage regulation subcircuit. These linear IC devices incorporate transistors constrained to operate within a relatively linear region of operation which happens to be a relatively inefficient region of operation. (By contrast, switching regulator IC devices permit the transistors in the integrated circuit to operate in relatively efficient Class C mode of operation.) Until fairly recently, such linear regulator circuits were considerably less efficient than switching regulator circuits, and generated an undesirable amount of heat, although such linear regulators were typically lower in cost than switching regulators. For the older type of linear regulator, the minimum differential voltage (generally referred to as the "minimum dropout voltage") between unregulated voltage at the input of the linear regulator circuit and the regulated output charge voltage of the linear regulator circuit was approximately 1.5 volts when used for constant-voltage regulation and 1.2 volts when used for constant-current regulation. As this differential voltage is relatively high, leading to relatively inefficient charging, linear regulators using the older type of linear regulator IC device were typically used only for low-power charging requirements.

A previously known battery-charging circuit not designed specifically for lithium-ion cells or batteries that uses only a single linear regulator charge control IC device that provides both charge current regulation and voltage regulation is shown in FIG. 11-2 of Gordon McComb, *Robot Builder's Bonanza* (New York, 1987), p. 81. However, that circuit includes a current limiting resistor and a silicon-controlled rectifier and appears to be designed to provide constant charging current until the charging voltage reaches the maximum charging voltage.

More recently, a new generation of linear regulator charge control IC devices has been developed that offers significant improvements in efficiency and a reduction in heat generation. These new regulators are frequently referred to as low drop-out voltage regulators or "LDO" regulators, because the minimum differential voltage (dropout voltage) between input supply voltage and output charge voltage can be as low as about 0.5 volts when used for constant-voltage regulation and as low as 1.2 volts (about the same as for the older type of linear regulator IC device) when used for constant-current regulation of the charging circuit. The 0.5-volt differential when the IC device is operated in constant-voltage mode permits these LDO regulators to operate from an unregulated DC supply voltage that is appreciably closer to the maximum charging voltage than was the case for the older linear regulator IC devices, thereby reducing power dissipation.

The older type of linear regulator charge control IC device is exemplified by the Motorola™ LM317 IC device. The more recently available LDO linear regulator charge control IC device is exemplified by the Micrel™ MIC29372 IC device.

Despite the improvements effected in IC design, lithium-ion cell charging circuits of the types previously known remain inherently inefficient because they operate from unregulated DC power that is supplied at a voltage significantly above the maximum charging voltage; the inefficiencies are also due to the conventional use of bath charge current and charge voltage regulating subcircuits, both of which dissipate energy.

Prior art, such as European Patent document EP 0 825 699 A (Benchmark Microelectronics), teaches that both charge current and charge voltage should be actively regulated during the charging of lithium-ion cell; the charge current initially at a constant value until the charge voltage reaches the manufacturer's suggested maximum charging voltage and the charging voltage at the maximum charging voltage thereafter. Actively regulating current to a constant value requires that the regulating subcircuit be supplied with a high enough voltage that the regulator will not drop out of regulation as the charging voltage increases to the maximum charging voltage

SUMMARY OF THE INVENTION

The conventional design approach heretofore taken for the design of the regulation of lithium-ion cell or battery charging circuits proceeds on the premise that it is a good idea for the regulating circuit to be constantly active and to be regulating charging voltage and/or charging current throughout the complete cell charging process. (Herein frequent reference will be made to the "cell" to be charged, it being understood that with appropriate adjustments, one may in each case charge a battery of cells. Generally, a reference to a "battery" should be understood to include a reference to a single cell.)

According to the invention, the transformer used in the lithium-ion charging circuit is selected so that its inherent current-limiting characteristic (loading effect) permits the circuit to charge the lithium-ion cell during an initial period in which the regulator circuit need not perform any regulating function. This enables a satisfactory regulator circuit to be designed according to the invention using only a single charge control IC device that in an initial stage of the charging operation is in non-regulating mode, permitting the rectified transformer secondary output to be applied to the lithium-ion cell with only a minimum voltage drop across the single IC device (present in a voltage regulating subcircuit), as compared to two voltage drops across two IC devices (one in a current-regulating subcircuit and one in a voltage-regulating subcircuit) that would be present in conventional charging circuits, thereby affording substantial energy savings. When the charge voltage reaches a pre-set threshold level, the regulator circuit functions for the remainder or the charging operation in a manner similar to that of previous voltage regulation subcircuits, but with less overall power loss, since there is no separate current-regulation subcircuit present.

Accordingly, the invention provides a charging circuit for a lithium-ion cell (or battery) including a selected suitable transformer characterized by an inherent secondary output current-limiting capability that meets the initial current-limiting needs of the charging circuit, in combination with a suitable rectifier circuit (that may itself be of conventional design) and a linear charge-voltage regulating subcircuit that during the initial part of the charge cycle does not operate in regulating mode. Otherwise the linear charge-voltage regulator subcircuit and the rest of the circuit may be of conventional design, except that no separate charge-current regulator subcircuit is necessary nor present, thereby avoiding the associated power dissipation that occurs in such subcircuit present in conventional designs.

During the initial stage of the charging operation, charge voltage and charge current are maintained within acceptable limits by the condition of the discharged lithium-ion cell and the inherent secondary winding current-limiting characteristic of the transformer itself, and therefore the linear charge-voltage regulating subcircuit drops the supply voltage only by a minimum voltage drop (the minimum dropout voltage) between the rectified transformer secondary output and the lithium-ion cell being charged. The charge current applied during this initial stage slowly declines as the voltage across the cell being charged increases. For that reason, this initial mode of operation of the charging circuit may be referred to as "taper current mode", since the current tapers off from an initial value varying more or less linearly with time to a reduced value.

During the later stage of the charging operation, the linear charge-voltage regulating subcircuit operates in the same manner as a conventional such subcircuit to limit applied charge voltage to the maximum charging voltage, during which time charge current decreases substantially logarithmically in the same manner as would occur in a conventional charging circuit incorporating linear regulation. Preferably the linear regulator IC device used in the charge-voltage regulating subcircuit is of the LDO type for maximum efficiency and charge capacity.

The inventor has found that the charge-current regulator subcircuit and the consequent power dissipation associated with such subcircuit may be eliminated without significantly affecting the performance of the battery charger while maintaining the charging voltage within safe limits. The elimination of the current-limiting subcircuit offers both improved energy efficiency and reduced cost of manufacture of the charging circuit, because not only is one subcircuit eliminated, but the required transformer can be smaller and lighter.

Note that it is important that the current rating and secondary voltage of the transformer be carefully selected, both to prevent damage to the cell during the initial charging stage and to provide an appropriate transformer loading curve so that the supply voltage begins to be regulated after the desired portion of the charging cycle has been completed. Specifically, a current rating for the transformer should be selected that is not greater than the maximum charging current for the cell or battery suggested by the manufacturer. The secondary voltage of the transformer (and therefore the characteristics of the transformer loading curve) should then be selected so that when the maximum charging current is flowing through the secondary winding of the transformer, the voltage supplied to the voltage regulating subcircuit is approximately equal to the sum of (1) a minimum charging voltage of the cell or battery to be charged selected to be somewhat less than the manufacturer's nominal voltage rating of the battery and (2) the minimum voltage drop across the voltage regulating subcircuit. To compensate for line voltage variations, it is advisable to select the secondary voltage of the transformer based upon the maximum expected transformer primary voltage, rather than upon the average primary voltage, to avoid having the current flow during the initial charging stage exceed the transformer rating due to higher than average primary voltage.

A minimum charging voltage somewhat less than the nominal voltage is desirable, although the exact voltage used is not critical. For example, the battery manufacturer's specifications for the battery for which the charge is being designed should provide the charging voltage as a function of time, assuming constant current until the charging voltage rises to the maximum charging voltage. In typical batteries known to the inventor, the charging voltage increases almost instantly from the discharged voltage (which may be as low as 2.5 volts) to approximately 3.3 to 3.7 volts reaching roughly 3.6 to 3.9 volts within a few minutes, depending upon a number of factors including the age and prior use of the battery. After the first few minutes the charging voltage continues to climb, but somewhat more slowly, until it reaches the maximum charging voltage of 4.1 or 4.2 volts as specified by the manufacturer (at which point the charging circuit must clamp the voltage or the battery may be damaged). While an initial charging voltage of 3.4 volts or even less could be used, the inventor has found that using an initial charging voltage of 3.5 to 3.6 volts to select the current rating of the transformer does not cause the charging current during the first few minutes under charge to reach levels high enough to adversely affect the battery being charged.

In accordance with the invention, for given battery specifications, the transformer selected for the charger will have a lower power rating (a lower current rating at the rated voltage) because the charging current decreases as the charging voltage increases. In a conventional charger in which current is regulated to a constant value until the charging voltage rises to the maximum charging voltage, the power consumed by the circuit must increase as the voltage rises as the current is being held constant. Hence the transformer must be rated to provide the maximum charging current at the maximum charging voltage, rather than at the minimum charging voltage selected as discussed above. A transformer with a lower power rating is lighter, smaller, and less expensive and generates less heat.

As mentioned, in this specification, in many passages, reference will be made to the charging of a lithium-ion cell; the representative voltages and currents specified at various points in the charging circuit are for a representative such cell, and the charging circuit parameters for such cell will be given typical values. However, it is to be understood that there is a variability in the characteristics of commercially-manufactured lithium-ion cells; such variability has to be taken into account in establishing various critical voltage and current values within the charging circuit. Further, it is to be understood that a given charging circuit could be designed to charge two or more lithium cells arranged in parallel or in series, and that depending upon the load for the circuit (i.e. the number of lithium-ion cells to be charged and whether they are connected in parallel or series) such values again would require adjustment from the typical values given in this specification.

The method according to the invention may be referred to as a "starved regulator technique" or as a "tapered current/constant voltage" technique. Reference to a "starved regulator" is appropriate because during the initial charging phase, the linear regulator IC device does not limit the charge voltage as the supply voltage is too low to require limiting. The regulator is starved for lack of voltage; this is not the way in which such regulators are designed to be used. The term "tapered current/constant voltage" is appropriate because current steadily diminishes as the threshold voltage is approached at which charge voltage regulation commences; charge voltage is maintained at a constant value during the regulated stage of the charging operation.

While the invention is optimized if the more recently available LDO charge-control IC device is used, the invention may also make use of the older generation of linear IC devices, and in that event entails advantages of the sort recited in the preceding description relative to previously known circuits that employ the older generation of linear IC devices. In each case, the conventional current-regulating subcircuit can be eliminated.

SUMMARY OF THE DRAWINGS

FIG. 3 is a circuit diagram of a charging circuit for a lithium-ion cell including a charge-voltage regulator subcircuit in accordance with the invention, and incorporating an older known type of charge control IC device.

FIG. 4 is a circuit diagram of a charging circuit for a lithium-ion cell including a charge-voltage regulator subcircuit in accordance with the invention, and incorporating a more recent known type of charge control IC device.

DETAILED DESCRIPTION WITH REFERENCE TO THE DRAWINGS

In the following, if a voltage is stated at a particular point in a circuit, it is to be understood that such voltage is measured relative to ground. In each of FIGS. 1 through 4, the grounds are terminals G1, G2, G3, and G4, respectively.

Figure 1:
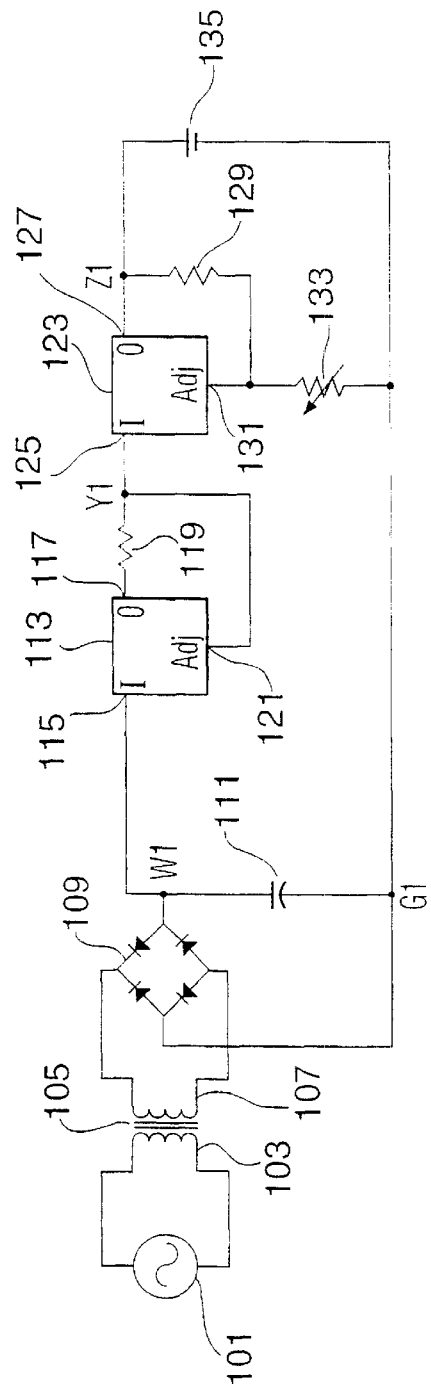
FIG. 1 is a circuit diagram of a charging circuit for a lithium-ion cell incorporating a linear regulator subcircuits of the type previously known in the technology, and incorporating an older known type of charge control IC device.

FIG. 1 illustrates a conventional lithium-ion cell charging circuit whose elements are interconnected in accordance with known technology. An alternating-current source 101, which may typically be a mains power source at standard mains voltage (110–120 volts in North America), provides power to the input winding 103 of a transformer 105 whose secondary winding 107 delivers an AC output that is rectified by a bridge rectifier circuit 109 and is smoothed by smoothing capacitor 111. If desired, more elaborate smoothing may be provided in this conventional circuit and in the charge circuit according to the invention, to be described below. If the resulting unregulated DC current applied at a voltage $V_{W1}$ between terminals W1 and G1 in the circuit were applied directly to lithium-ion cell 135 to be charged, there would be a serious risk of applying too high a charging current or too high a charging voltage, or both, to the lithium-ion cell 135, risking damage to the cell 135 and other hazards (including serious internal gas expansion within cell 135 and potentially an explosion). Accordingly, it is conventional to provide in such charging circuit regulator subcircuits to control the current and voltage applied to the cell 135.

If the lithium-ion cell 135 is nearly fully discharged to rated minimum discharge voltage when it is connected to the circuit of FIG. 1 at terminals Z1 and G1 for recharging, there is no immediate risk or applying too high a charging voltage (the fully discharged condition of cell 135 precludes too high an initial charge voltage rise); the immediate risk is that too high a charging current might be applied. Accordingly, the linear current regulator subcircuit comprising charge control integrated circuit (IC) device 113 and resistor 119 ensures that charging current is kept within an acceptable range. Once the charge voltage at terminal Z1 in the circuit reaches the maximum charge voltage acceptable for charging the lithium ion cell 135, a second regulator subcircuit limits the charge voltage to hold the charge voltage at or below a preset maximum voltage.

The second regulator subcircuit (charge-voltage subcircuit) comprises charge control IC device 123, fixed resistor 129, and variable resistor 133. Fixed resistor 129 and variable resistor 133 are used to set the regulated value of the charge voltage in accordance with the instructions of the manufacturer of the charge control IC device 123. Resistors 129 and 133 may normally be omitted if the IC device 123 has been designed by the manufacturer for the particular lithium-ion cell to be charged.

The charge-voltage subcircuit limits the charge-voltage to the maximum voltage for the particular lithium-ion cell to be charged.

The IC devices 113 and 123 are conventional and may each be one and the same type of device, for example, the Motorola™ model LM317 charge control IC device. The IC devices 113 and 123 are connected within their respective subcircuits in conventional manner. The input terminal 115 of IC device 113 is connected to the positive output terminal W1 of the bridge rectifier 109. (Terminals W1, G1, Y1 and Z1 in the circuit may or may not be correlatable with physically discrete terminals. as the circuit designer may prefer). The output terminal 117 of IC device 113 is connected to one terminal of resistor 119, and the other terminal of resistor 119 is connected to the adjustment input terminal 121 of IC device 113. The bridge rectifier negative terminal G1 (which may be considered a ground line for the circuit) is connected to the negative terminal of lithium-ion cell 135.

IC device 123 is similarly conventionally connected. The input terminal 125 of IC device 123 is connected to terminal Y1, the output terminal 127 of IC device 123 is connected at terminal Z1 to one terminal of resistor 129 whose other terminal is connected to the adjustment terminal 131 of IC device 123. The variable resistor 123 is connected between the adjustment terminal 131 and terminal G1. If the IC device 123 has been designed by the manufacturer as discussed above, then terminal 131 (which would then be referred to as ground terminal 131) is connected directly to the terminal G1; resistors 129 and 133 are omitted.

During the initial stage of the charging operation, the current regulator subcircuit comprising IC device 113 and resistor 119 regulates current, but IC device 123 provides an unregulated connection between its input terminal 125 and output terminal 127, since the output voltage (the charge voltage applied to lithium-ion cell 135) does not require regulation during the initial stage of the charging operation. However, when the charge voltage at terminal Y1 reaches the established threshold at which the maximum permitted charging voltage for application to cell 135 appears at terminal Z1 (relative to ground voltage at terminal G1, of course), IC device 123 begins to regulate the output voltage at terminal Z1, maintaining it at the maximum permitted charge voltage value pre-set for charging the cell 135. From the time that IC device 123 begins to regulate the output voltage at terminal Z1 that charges the cell 135, the charge current applied to cell 135 begins to decline approximately logarithmically, and eventually approaches zero by the time that the cell 135 is fully charged to the capacity permitted by the pre-set regulated charge voltage.

Figure 2:
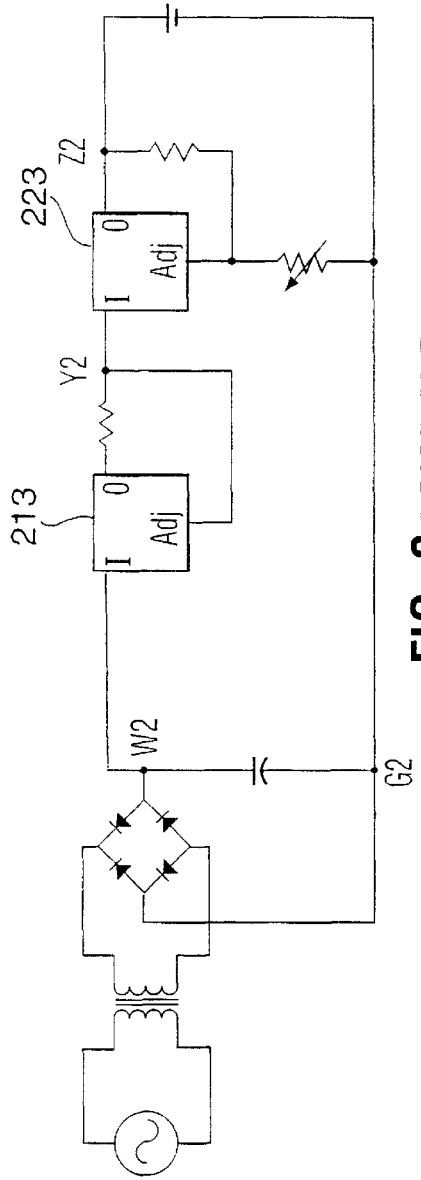
FIG. 2 is a circuit diagram of a charging circuit for a lithium-ion cell incorporating a linear regulator subcircuit of the type previously known in the technology, and incorporating a more recent known type of charge control IC device.

FIG. 2 is a charging circuit for a lithium-ion cell that is essentially identical to the circuit of FIG. 1 except that charge control IC devices 213 and 223 respectively have been substituted for charge control IC devices 113 and 123 of FIG. 1. Otherwise, the circuit of FIG. 2 may be identical to the circuit of FIG. 1. The charge control IC devices 213 and 223 of FIG. 2 are the more recent "low drop-out voltage" or "LDO" type of IC devices capable of operating with a lower minimum differential voltage across charge control IC device 223. The IC devices 213 and 223 are conventional and may each be one and the same type of device, for example, the Micrel™ model MIC29372 charge control IC device.

FIG. 3 illustrates a charging circuit according to the invention for a lithium-ion cell 335 that resembles, to a considerable extent, the charging circuit of FIG. 1 but completely eliminates the charge current regulator subcircuit of FIG. 1. In FIG. 3, an alternating current source 301 provides power to the input winding 303 of a suitable transformer 305 whose secondary winding 307 provides an output AC current that is rectified by bridge rectifier 309, the output of which is smoothed by smoothing capacitor 311. The charging circuit illustrated in FIG. 3 will also perform advantageously, at least for some applications, without the smoothing capacitor 311, but the smoothing capacitor 311 is desirable to increase the effective DC voltage and to correct the power factor.

The transformer 305 is selected not only for suitability to meet the usual charging circuit requirements, but also for its inherent current-limiting capability during the initial mode of operation of the circuit that enables the conventional current-limiting subcircuit to be eliminated. In the transformer 305, the windings ratio is selected to provide an output AC voltage that after rectification delivers a DC supply voltage across terminals W3, G3 that is sufficient to provide a regulated charge voltage at the preferred maximum pre-set value (which DC supply voltage may be lower than that provided in the circuit of FIG. 1 by at least the minimum dropout voltage of the charge control IC device 113), but with a voltage and current rating low enough to limit initially the charge current in the manner discussed below. Otherwise, circuit elements 301, 305, 309, and 311 may be essentially identical to the counterpart circuit elements 101, 105, 109, and 111 of FIG. 1 and are interconnected in essentially the same way.

However, in contradistinction to conventional charging circuits, the output of the bridge rectifier 309 applied across terminals W3 and G3 of FIG. 3 is not regulated by any active current regulating device; instead, the circuit of FIG. 3 relies upon the inherent current regulatory capability of the transformer 305 to limit charge current, as will be further discussed below.

Charge control IC device 323 may be identical in type to IC device 123 of FIG. 1, e.g. a Motorola™0 LM317 device, and is connected in the circuit of FIG. 3 in generally the same way as IC device 123 is connected in the circuit of FIG. 1. As is the case with FIG. 1, as long as the charge voltage applied across the lithium-ion cell 335 remains below the designed maximum charge voltage for the circuit, charge control IC device 323 does not regulate the charge voltage, but begins to operate in regulation mode only when the charge voltage at terminal Z3 has reached the designed permitted maximum value. Accordingly, to achieve this charge voltage regulation, input terminal 325 of IC device 323 is connected to the bridge rectifier output positive voltage terminal W3 (there being no intervening charge current regulator circuit), and the output terminal 327 of IC device 323 is connected to the positive terminal of lithium-ion cell 335; the connection terminal is identified as Z3. Connected between the output terminal 327 and the adjustment terminal 331 of IC device 323 is the resistor 329 whose resistance may be selected to be the same as that of resistor 129 of FIG. 1, assuming that IC device 323 is of the same type as IC device 123 of FIG. 1. Connected between the adjustment terminal 331 and "ground" terminal G3, which is connected to the negative terminal of lithium-ion cell 335, is an adjustable resistor 333 that can be essentially identical to adjustable resistor 133 of FIG. 1, again assuming that IC device 323 is of the same type as IC device 123 of FIG. 1. Resistors 329 and 333 may be omitted and terminal 331 (which would then be referred to as ground terminal 331) connected directly to "ground" terminal G3 if the IC device 323 has been designed by the manufacturer for the particular lithium-ion cell to be charged.

FIG. 4 is a charging circuit for a lithium-ion cell 435 that is essentially identical to the charging circuit of FIG. 3 except that IC device 423 is of the "low drop-out voltage" or "LDO" type more recently available. Otherwise, the elements of FIG. 4 are essentially identical to the counterpart elements of FIG. 3. Thus AC source 401, transformer 405 having primary winding 403 and secondary winding 407, bridge rectifier 409 and smoothing capacitor 411 are essentially identical to the counterpart elements 301, 305, 309 and 311 of FIG. 3, the output of the bridge rectifier 409 of FIG. 4 being applied across terminals W4 and G4. Terminal G4 serves as ground terminal for the circuit and is connected to one terminal of adjustable resistor 433 and to the negative terminal of lithium-ion cell 435. Resistor 429 may be of the same resistance value as resistor 329 (again assuming identity of type of IC devices 323, 423) and is connected along with adjustable resistor 433 to the adjustment terminal of IC device 423 in essentially the same manner as resistor 329 and adjustable resistor 333 are connected in FIG. 3. The input, output and adjustment terminals of IC device 423 are identified by reference numerals 425, 427, and 431 respectively. The output voltage applied at circuit terminal Z4 to the positive terminal of lithium-ion cell 435 is regulated by charge control IC device 423 in essentially the same way as the voltage at terminal Z3 is regulated by the IC device 323 of FIG. 3, the significant difference being that the minimum difference between the supply voltage at terminal W4 and the regulated charge voltage at terminal Z4 is lower for the circuit of FIG. 4 than for the circuit of FIG. 3 because the LDO charge control IC device 423 operates at a lower dropout voltage.

IC device 423 may be essentially identical to the IC device 223 of FIG. 2 and may be, for example, a Micrel™ model MIC 29372 device.

The reason that the charging circuits of FIGS. 3 and 4 are able to function successfully despite the absence of a charge-current regulating subcircuit is that the transformer 303 or 403, as the case may be, is selected so that its loading effect provides an inherent current-limiting function. An understanding of this phenomenon is facilitated by reference to the graph of FIG. 5.

Figure 5:
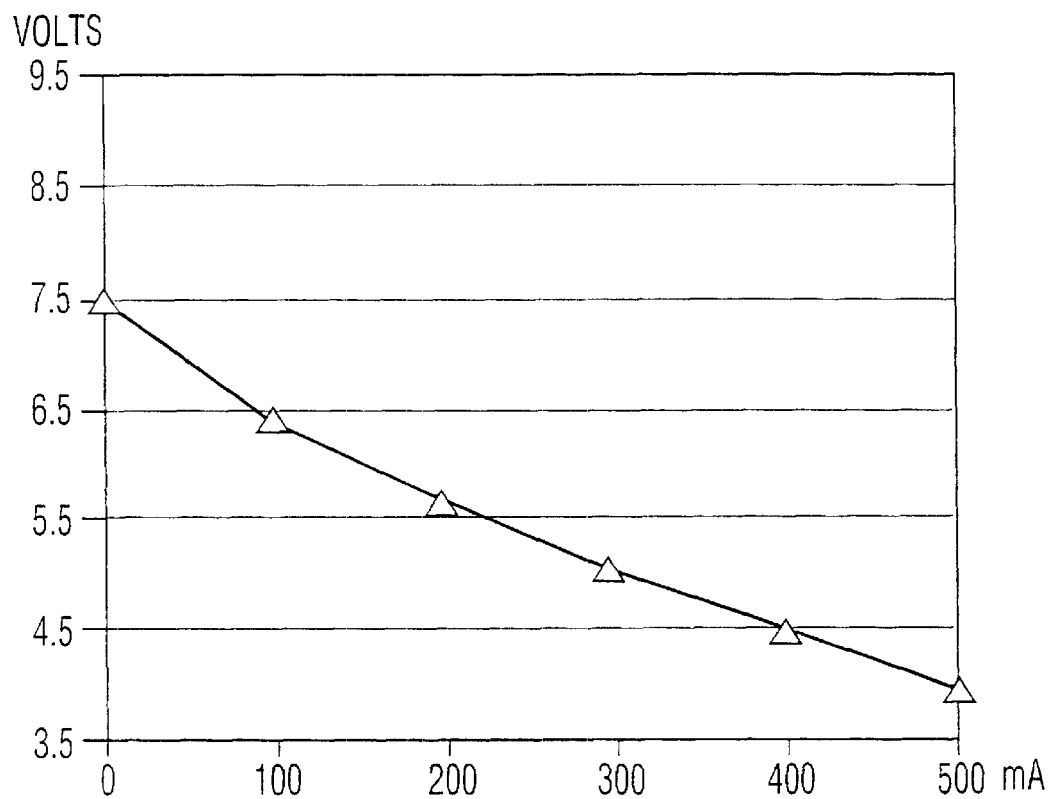
FIG. 5 is a graph plotting the output voltage against output current of a universal AC adaptor used in place of the transformer, bridge rectifier, and smoothing capacitor of FIG. 3 for the purpose of testing the circuit shown in FIG. 3.

FIG. 5 is a graph of the output voltage representative of that of a typical power transformer of the type that would be used in the circuits shown in FIGS. 1–4 measured after rectification and smoothing. In FIG. 3, this voltage would be measured at terminal W3. For convenience, the voltage plotted in FIG. 5 is the measured output voltage of a 300 mA-rated universal (multi-voltage) AC power adaptor set at the 6.0 volt setting with a line voltage input of 110 volts AC and assuming a variable load over the range plotted, the variation in the load correspondingly varying the current draw. The AC power adaptor includes a 300 mA-rated transformer corresponding to transformer 303 or 403 and rectification and smoothing components equivalent to those in FIGS. 1–4. Note that the 6.0 setting indicates an output voltage of 6.0 volts DC at 300 mA with an input voltage of 120 volts AC rather than 110 volts AC. The lower input AC voltage used to obtain the data for FIG. 5 resulted in a reduction in the output voltage at 300 mA current to about 5.0 volts DC.

As is apparent in FIG. 5, the rectified and smoothed DC voltage provided by an unregulated DC power supply (an example of which is the portion of the circuit shown in FIG. 3 between the alternating current source 301 and terminal W3 of the smoothing capacitor 311) declines with increasing current draw. To utilize this effect so that no charge-current regulating subcircuit is needed, the battery charger designer must select an appropriate transformer. Rectification and smoothing may be accomplished by a variety of known circuit designs. The use of designs for rectification and smoothing other than that shown in FIGS. 1–4 may result in a different constant voltage drop across the rectifier from that discussed below, but the rate of decline of voltage with increasing current will not be affected. To select a transformer appropriate for use in a charging circuit for a particular lithium-ion cell or battery, the current rating and secondary voltage of the transformer must be determined. Cell/battery manufacturers generally suggest a charging rate (conventionally referred to as "C" or "C rate") for a lithium-ion cell or battery of 0.5 C to 1.0 C to obtain an optimal compromise between charge time and cell or battery lifetime. The C rate is the value of current required to provide a given charge capacity within a given time, and its unit is defined so that a 1.0 C rate is a rate that discharges the cell or battery in 1 hour. For example, the 1.0 C rate for a 500 mAh battery is 500 mA and a 0.5 C rate is 250 mA. A transformer current rating should preferably be selected that is within the 0.5 C to 1.0 C range, or at least not above the 1.0 C rate, to obtain optimal cell or battery life and minimize transformer weight and size. (Lower C rates can be chosen, but these appreciably increase the required charging time). The transformer's secondary voltage at the selected current rating should then be selected so that the DC voltage supplied to the voltage regulator (IC device 323 in the circuit shown in FIG. 3 and voltage regulator IC device 423 in the circuit shown in FIG. 4) is approximately equal to the sum of (1) an initial minimum charging voltage of the cell or battery to be charged (typically chosen as approximately 3.5 or 3.6 volts based upon measurements of the charging characteristics of the cell or battery to be charged) and (2) the minimum dropout voltage of the voltage regulator of approximately 1.8 to 2.0 volts for a typical voltage regulator IC such as the LM317 (for low dropout voltage regulators such as the MIC 29372 the minimum dropout voltage may be as low as approximately 0.8 volts, increasing in proportion to the load current). Typically the secondary voltage of the transformer should therefore be selected so that the DC voltage supplied to the voltage regulator is about 5.3 to 5.6 volts at the selected current rating for a voltage regulator IC such as the LM317. Selection of a higher secondary voltage would cause current in excess of the transformer's current rating to be drawn during initial charging, and selection of a lower secondary voltage would reduce the charging current.

To compensate for line voltage variations it is advisable to select the current rating of the transformer as approximately the 1.0 C rate and the secondary voltage of the transformer based upon the maximum expected transformer primary voltage to avoid the current exceeding the transformer rating.

EXAMPLES

Example 1

In a representative lithium-ion cell charging circuit in conformity with FIG. 3, the cell 335 (an NEC Moli Energy Corporation IMP220748) to be charged had a nominal 3.6 volt/500 mAh rating. A current rating of 300 mA was selected, as it is a readily available current rating for power transformers and is within the desired range for a 500 mAh cell, as discussed above. In testing the circuit, in place of the transformer 305, bridge rectifier 309, and smoothing capacitor 311, a 300 mA rated universal (multi-voltage) AC power adaptor set at the 6.0 volt setting and supplied by an AC input voltage of approximately 110 volts was used (the same input voltage used to obtain data for the loading curve plotted in FIG. 5). Hence the unregulated voltage/current relationship, measured across the smoothing capacitor 311, is as shown in FIG. 5. A Motorola™ LM317 device was chosen as the IC device 323. Resistor 329 had a resistance of 2 kΩ and variable resistor 333 a maximum resistance of 1 kΩ. In this example, the transformer 305 was selected based upon its current rating at 110 volts AC input. As discussed above it is preferable to use the current rating at the maximum expected line voltage, which can be as high as 132 volts AC. However, as the current rating selected was considerably less than the 1.0 C rate (300 mA rather than 500 mA), the transformer selected is appropriate. The examples given below illustrate selection of transformer specifications based upon maximum line voltage. While the current rating for transformer selected for this example at an input of 132 volts AC and a selected voltage of 6.0 volts is not known, it is expected that the rating would be not be greater than 500 mA (maximum charging current suggested by the manufacturer).

As discussed above, charging occurs in two stages. In the first stage (before the voltage across the cell 335 reaches 4.1 volts), assume that at a given time the cell 335 is partially charged so that the charge voltage at terminal Z3 is, for example, 3.5 volts. The IC device 323 is set by the resistors 329 and 333 so that it will not regulate until the charge voltage at terminal Z3 is 4.1 volts. As IC device 323 is not regulating voltage, its input voltage (terminal W3) will be higher than the voltage at its output (terminal Z3) of 3.5 volts by its minimum dropout voltage of approximately 1.8 volts, hence the voltage at terminal W3 will be approximately 5.3 volts. From the loading relationship shown in FIG. 5, the current drawn by the battery will be limited to approximately 300 mA, which is the rated current of the transformer (in this example, the rated current of the power adaptor).

As the cell 335 becomes charged, the voltage at terminal Z3 will gradually increase until it reaches 4.1 volts and the second stage of the charging process begins. The voltage measured at terminal Z3 (the voltage drop from terminal Z3 to terminal G3) is the sum of the battery voltage and the voltage drop across the internal resistance of the battery due to the current flowing through the battery. Note that the battery voltage is here distinguished from the voltage drop across the battery measured at terminal Z3. The battery voltage will be slightly less than 4.1 volts (or else charging would cease as no current would flow) and the continuing charging current will be decreasing as the battery accepts further charge and the voltage increases toward 4.1 volts. When the voltage at reaches 4.1 volts, the input voltage of the IC device 323 at terminal W3 will be approximately 5.6 volts. At 5.6 volts, the transformer 305 will limit the current to approximately 200 mA, as can be seen from FIG. 5. It can be seen that as the charge voltage increased during the first stage, the charging current gradually declined, or "tapered down", linearly from approximately 300 mA to approximately 200 mA.

During the second stage, as the battery continues to charge, the battery voltage approaches 4.1 volts and the current through the battery must decline as the internal resistance is fixed and the voltage drop across the internal resistance is the difference between the regulated voltage across the battery and the battery voltage. The declining current causes the voltage at terminal W3 to increase as the load on the transformer 305 is further reduced, but the increased voltage at terminal W3 is limited by the IC device 323. This increases the voltage drop across IC device 323, but the current is declining rapidly so that the power dissipated by IC device 323 decreases.

Figure 7:
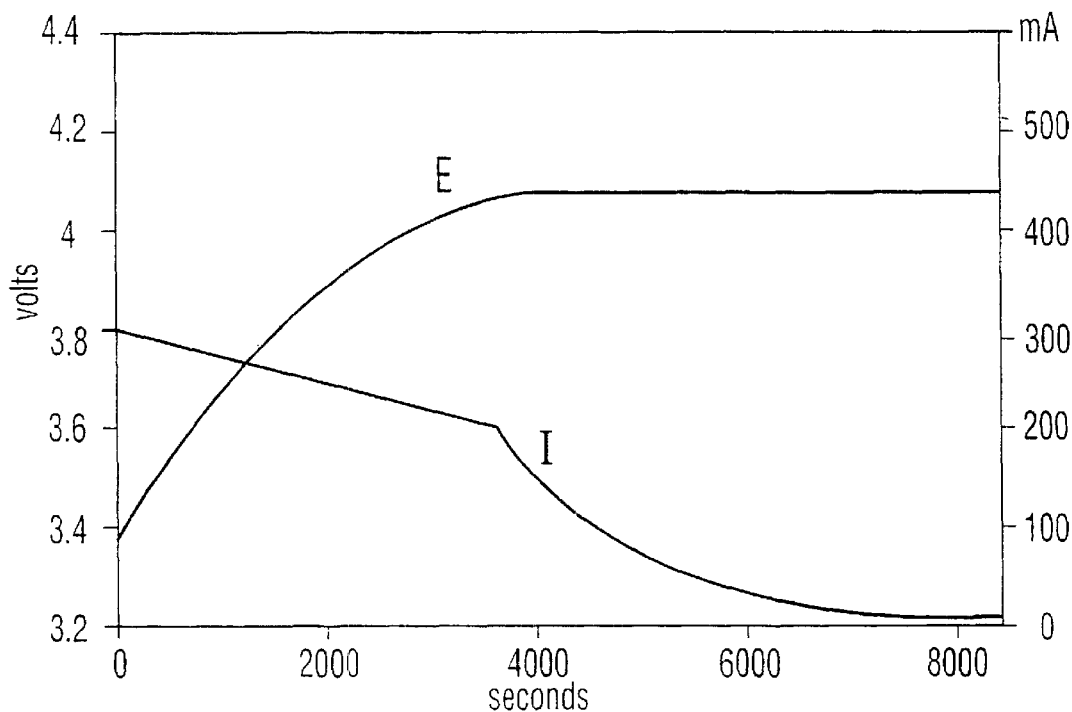
FIG. 7 is a graph plotting the voltage drop across and the current through the lithium-ion cell of FIG. 3 during the operation of the charging circuit of FIG. 3.
Figure 8:
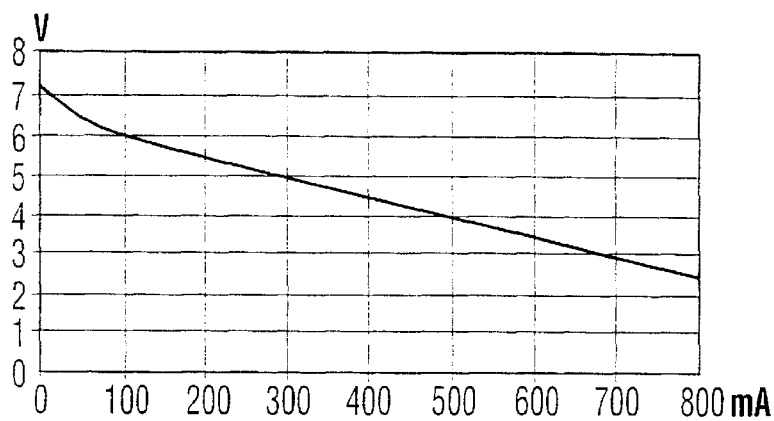
FIGS. 8–11 are graphs plotting the output voltage against output current of AC adaptors rated at 300, 400, 800, and 1200 mA, respectively, each used in place of the transformer, bridge rectifier, and smoothing capacitor of FIG. 4 for the purpose of testing the circuit shown in FIG. 4.

The behavior of the voltage measured at terminal Z3 (labelled "E") and the current (labelled "I") passing through terminal Z3 during the charging of cell 335 discussed above is illustrated by the charging curves shown in FIG. 7. For example, the transition from the first to the second stage takes place at just under 4000 seconds.

Example 2

Figure 6:
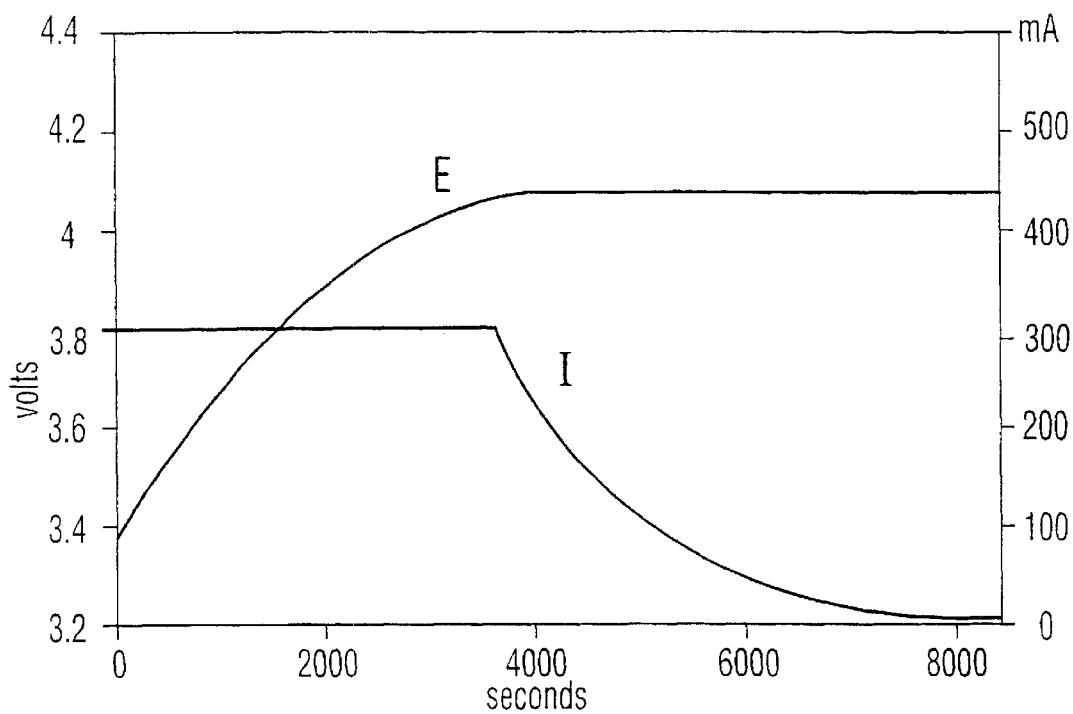
FIG. 6 is a graph plotting the voltage drop across and the current through the lithium-ion cell of FIG. 1 during the operation of the charging circuit of FIG. 1.

A similar illustration of the behavior of the voltage measured at terminal Z1 (labeled "E") and the current (labelled "I") passing through terminal Z1 during the charging of cell 135 in the prior art circuit shown in FIG. 1 is shown in the charging curves of FIG. 6. The measurements used to plot FIG. 6 were obtained by using the same 300 mA rated universal (multi-voltage) AC power adaptor that was used to obtain data for the loading curve plotted in FIG. 5 except that the output voltage selector of the power adaptor was set at the 9.0 volt setting. The adaptor was supplied by an AC input voltage of 110 volts. In place of the transformer 105, the bridge rectifier 109 and the smoothing capacitor 111 shown in FIG. 1 the adaptor was used.

A comparison between the charging curves shown in FIG. 6 and those shown in FIG. 7 suggests that the circuit shown in FIG. 3, which is a battery charger in accordance with the invention, is capable of charging a lithium-ion cell in essentially the same time as the prior art charger circuit shown in FIG. 1, but does so without the charge-current regulating subcircuit of FIG. 1, provided that an appropriate transformer current and voltage rating are selected.

Note that the universal (multi-voltage) AC power adaptor used in the examples given above contains a multi-tap transformer and provides a selector switch for selecting a tap for the desired output voltage. (Neither a designer of a battery charger in accordance with the prior art nor a designer of a battery charger in accordance with the invention would be likely to use a multi-tap transformer except for testing, but would instead select a power transformer with the desired current rating and a fixed voltage rating. Nevertheless, the choice of such multi-tap transformer for testing purposes is not inappropriate.)

Example 3

As a further example, battery chargers for NEC Moli Energy Corporation lithium ion rechargeable batteries models IMP300648-1, IMP340848-1, and IMP341065 may be designed using single-voltage AC adaptors such models T35-4.4-300, T35-4.4-400, T35-4.4-800, and T35-4.4-1200 obtained from ENG Electric Co. Ltd., 3F No. 558, Hong Chang Twelve St., Taoyuan City, Taiwan ROC. Such AC adaptors contain a transformer, a bridge rectifier, and a smoothing capacitor so as to provided an unregulated DC power supply for use as a battery substitute for battery powered devices. Since the adaptor inherently includes a transformer (305, 405), a bridge rectifier (309, 409), and a smoothing capacitor (311, 411), these elements of FIGS. 3 and 4 need not be separately provided.

The specifications of NEC Moli Energy Corporation lithium ion rechargeable batteries models IMP300648-1, IMP340848-1, and IMP341065 are provided in NEC documents Nos. PE2523 (Ver. 2), PE2526 (Ver. 3), PE2512 (Ver. 1), all published in April, 1999. The specifications of earlier similar models are given in earlier publications. Each battery is rated at a charge voltage of 4.2 volts and a nominal operating voltage of 3.8 volts.

Nominal capacities are 650 mAh, 1030 mAh, and 1650 mAh, respectively. For the purpose of designing a charger, the inventor has found that a minimum charging voltage somewhat less than the nominal operating voltage is desirable, although the exact voltage used is not critical. In this case, a minimum charging voltage of 3.6 volts is suggested by the following considerations. The NFC documents mentioned above show plots of the charging voltage as a function of time. In each case, the charging voltage increases almost instantly from the discharged voltage (which may be as low as 2.5 volts) to approximately 3.4 volts and climbs within a short time on the order of minutes to roughly 3.8 volts. From there it climbs somewhat more slowly until it reaches the maximum charging voltage of 4.2 volts (at which point the charging circuit must clamp the voltage or the battery may be damaged). While an initial charging voltage of 3.4 volts could be used, the inventor has found that using an initial charging voltage of 3.6 volts to select the current rating of the transformer does not cause the initial current to each levels high enough to adversely affect the battery being charged. Because initially the current and voltage are unregulated, if it happens that a battery is charged that has been fully discharged and the current rating of the transformer used in the charger was selected to be the 1.0 C rate based upon 3.6 volts as an initial charging voltage, the initial current will exceed the current rating of the transformer for a short period. However, the inventor has found that the 1.0 C rate is not exceeded by a significant amount for long enough to cause harm to the battery in such circumstances. Using a lower initial charging voltage for selecting a transformer would mean that a smaller transformer with a lower current rating would be chosen. Doing so would reduce the current provided to the battery throughout the charging cycle and therefore adversely affect the charging rate. A compromise between selecting a low initial charging voltage, which would decrease the charging rate, and a high initial charging voltage such as 3.8 volts, which would increase the possibility of damage to the battery in the initial portion of the charging cycle (only at the maximum line voltage, of course), is to use 3.5 or 3.6 volts as the initial charging voltage for the purposes of designing the charger.

FIGS. 8, 9, 10, and 11 are graphs of the DC output voltage in volts as a function of current in milliamps for adaptors T35-4.4-300, T35-4.4-400, T35-4.4-800, and T35-4.4-1200, respectively, based upon input voltages of 132 volts AC. Input voltages of 132 volts should be used in selecting an AC adaptor or an equivalent transformer/bridge rectifier 307/309 or 407/409 so that variations in line voltage with the normal range of 10% above the nominal line voltage of 120 volts AC will not cause the current at the minimum charging voltage to exceed the maximum charging current of the battery. If the AC adaptor is selected so that the maximum charging current for a particular battery at the minimum charging voltage is provided at an input voltage to the AC adaptor of 132 volts AC, then lower (and therefore safer) maximum charging currents will be provided at lower AC input voltages.

Example 4

Applying the inventive method discussed above, an AC adaptor for use in a battery charger within the scope of the invention for charging an NEC Moli Energy Corporation lithium ion rechargeable battery model IMP300648-1 (say) should be selected by finding an AC adaptor which provides a current of 650 mA or less at a voltage calculated as the sum of the 3.6 volt minimum charging voltage and dropout voltage of the linear regulator that limits the voltage across the battery (e.g., IC device 423 in FIG. 4). Typically, the dropout voltage is approximately 0.6 volts for a low dropout voltage device such as the Micrel™ model MIC 29372. Hence an AC adaptor that provides 4.2 volts at a current of 650 mA or less when provided with an input voltage of 132 VAC is optimal.

Example 5

Figure 9:
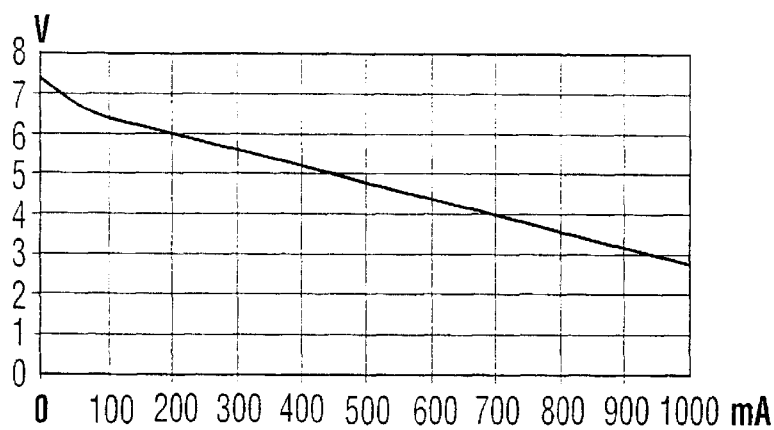
Figure 10:
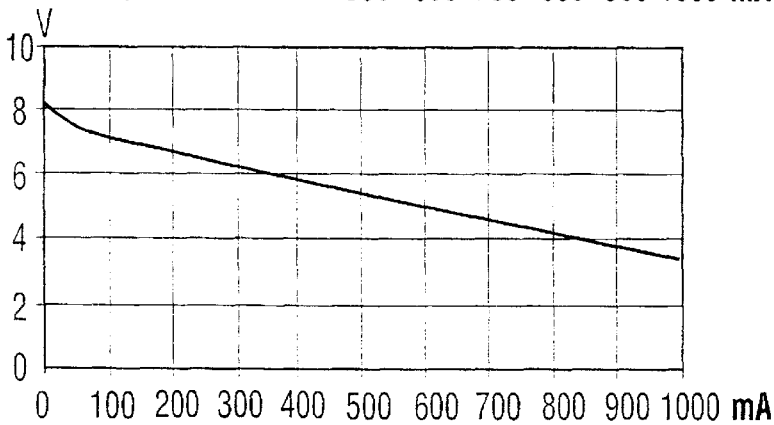
Figure 11:
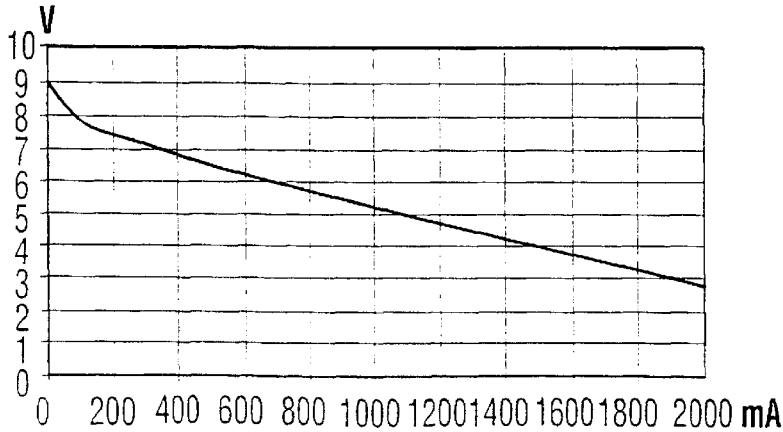

Inspection of FIGS. 8–11 indicates that the T35-4.4-400 adaptor, whose loading curve is plotted in FIG. 9, is an optimal choice for an NEC Moli Energy Corporation lithium ion rechargeable battery model IMP300648-1, assuming that a low dropout voltage device such as the Micrel™ model MIC 29372 is used as in the circuit shown in FIG. 4. The T35-4.4-800 and T35-4.4-1200 adaptors would not be usable as at 4.2 volts the current provided by each exceeds 650 mA. The T35-4.4-300 adaptor could be used, but would provide less current and therefore require more time to recharge the battery.

Similarly, of the AC adaptors under discussion, the best choices for the NEC Moli Energy Corporation lithium ion rechargeable batteries models IMP340848-1 and IMP341065 can be seen to be the T35-4.4-800 and T35-4.4-1200 adaptors, respectively. However, neither provides a full 1.0C current and are hence not optimal.

Comment on the Examples:

It is convenient to construct prototype battery chargers in accordance with the invention using such single-voltage AC adaptors such as the ENG Electric AC adaptors discussed above, as such adaptors are inexpensive and readily available.

However, battery chargers in accordance with the invention may be manufactured using discrete transformers 307, 407, bridge rectifiers 309, 409, and capacitors 311, 411, as the case may be. As a further option, a manufacturer of AC adaptors may simply modify its AC adaptor design to add the IC device 323, 423 (and associated resistors 329, 429 and 333, 433, if necessary), thereby producing a battery charger conforming to FIG. 3 or FIG. 4 and falling within the scope of the invention.

By contrast, the prior art of lithium-ion battery charger design teaches use of a higher voltage transformers than those discussed above in the present set of examples, necessitating the use of a charge-current regulating subcircuit, which in turn increases power dissipation losses as illustrated below.

Power Consumption in the Examples:

The following discusses the typical power dissipation of the circuits of FIGS. 3 and 4.

In taper current mode (IC device 323 not operating in voltage regulating mode), the maximum power dissipation of IC device 323 is given by:

$$P_d = (V_d)(I_{out}) = (1.5V)(0.3 A) = 0.45 W$$

where $P_d$ is the power dissipated in the IC device 323;

$V_d$ is the voltage drop across the IC device 323, i.e. the difference between the voltages at terminals Z3 and W3 in the circuit; and $I_{out}$ is the charge current supplied to the cell 335.

In constant-voltage mode (in which the IC device 323 is in regulating mode), the maximum power dissipation of the IC device 323 is roughly given by:

$$P_d = (V_W - V_Z)(I_{out})$$

where $V_W$ is a typical voltage at terminal W3 in the circuit during the constant-voltage stage; and $V_Z$ is the voltage at terminal Z3 in the circuit.

Accordingly, $$P_d = (6.4V - 4.1V)(0.2 A) = 0.46 W$$

The foregoing power dissipation losses at about 0.5 watt are significantly superior to power dissipation losses in the circuits of FIGS. 1 and 2, in each of which, assuming similar circuit implementation but necessarily involving a second charge control IC device in each circuit, power dissipation losses can easily exceed 1 watt.

If the circuit of FIG. 4 were substituted for that of FIG. 3 in the foregoing example, a further improvement in power dissipation losses would result; such losses in a circuit essentially equivalent to that discussed above but with a Micrel™ model MIC 29372 LDO device 423 substituted for the Motorola™ LM317 device specified above are typically less than about 0.25 W.

Effect of AC Line Voltage Variations on Charging Time:

Testing of lithium ion batteries suggests that the first 80% of capacity of the battery is attained during the portion of charging before the charging voltage reaches the maximum charging voltage specified by the manufacturer. Hence if 1000 mA of charging current is applied to a 1000 mAh cell, the 80% capacity level would be attained in approximately 0.8 hours.

The last 20% of capacity is attained during the constant voltage portion of charging. During that period, the battery determines the amount of current it can consume. The time the battery takes to attain the final 20% of capacity is approximately 1 hour regardless of how much charging current is available. Therefore the total time it takes to charge a 1000 mAh cell with a charging current of 1000 mA is approximately 1.8 hours. If only 500 mA of charging current is provided to a 1000 mAh cell, the first 80% of capacity would take 1.6 hours and the final 20% capacity would be attained in again 1 hour. Therefore the total charging time would be 2.6 hours.

If an AC adapter is selected for which the current of the AC adapter at a charging voltage of 3.6 volts is 450 mA with 108 volts AC input, 600 mA with 120 volts AC input, and 850 mA with 132 volts AC input, then the charging time to attain 80% capacity for 108 VAC input is 1000 mAh×80%÷450 mA=1.78 hours, for 120 VAC input is 1000 mAh×80%÷600 mA=1.23 hours, and for 132 VAC input is 1000 mAh×80%÷850 mA=0.94 hours. Since the last 20% will always take approximately 1 hour, the total times for the various input voltages are 2.78 hours for 108 VAC, 2.23 hours for 120 VAC, 1.94 hours for 132 VAC. For many applications this variation in charging times is not significant, especially in view of the reduced cost, size, and heat produced by a battery charge in accordance with the invention.

The foregoing discussion has proceeded on the basis that the output voltage at terminals W3 and W4 in the circuits of FIGS. 3 and 4 respectively is a DC voltage, but as a practical matter, there will continue to be some AC ripple in the voltage at this terminal in the respective circuit. However, the IC device 323 or 423 is effective to limit the charge voltage applied to the lithium-ion cell 335, 435 to values that do not damage the cell.

While the foregoing circuits have been described in the context of charging a lithium-ion cell, it is apparent that the circuits have utility whenever it is necessary to supply a charging current to a battery or the like, that during a first stage requires only that the charging current be below a specified value, and during a second stage additionally requires that the charging voltage be below a specified value.

Variations will occur to those skilled in the technology without involving any departure from the principles of the invention. For example, various other types of rectifier could be substituted for the bridge rectifier 309, 409, or various more elaborate smoothing circuits could be substituted for the smoothing capacitor 311, 411.

The scope of the invention is not limited to the circuits illustrated and described but is as defined in the appended claims.

What is claimed is:

1. A charging circuit for charging a lithium-ion cell or battery (335, 435) at a charging voltage that varies during the charging of the cell or battery (335, 435) from a selected minimum charging voltage to a predetermined maximum charging voltage, comprising:
   (a) a selected suitable transformer (305, 405) for transforming AC line voltage applied to the primary winding (303, 403) thereof to a lower AC secondary winding voltage;
   (b) a rectifier sub-circuit (309, 409) connected to the secondary winding (307, 407) of the transformer (305, 405) for rectifying the secondary winding voltage; and
   (c) a charge-voltage regulator sub-circuit (323, 423) connected between the rectifier sub-circuit (309, 409) and the lithium-ion cell or battery (335, 435) for receiving the rectified secondary winding voltage and providing an output charging voltage that is limited to the predetermined A maximum charging voltage; the charge-voltage regulator sub-circuit (323, 423) being connectable to the lithium-ion cell or battery (335, 435) for charging the lithium-ion cell or battery (335, 435) by applying the output charging voltage across the lithium-ion cell or battery (335, 435);

wherein
   (d) the charging circuit in operation provides charging current to the cell or battery (335, 435) in two successive stages, viz
      (i) a first stage, during which the charge-voltage regulator sub-circuit (323, 423) operates in non-regulating mode thereby to apply output charging voltage across the lithium-ion cell or battery (335, 435) at a value below the predetermined maximum charging voltage; and
      (ii) a second stage, during which the charge-voltage regulator sub-circuit (323, 423) operates in a voltage-regulating mode thereby to apply output charging voltage across the lithium-ion cell or battery (335, 435) at a value limited to the predetermined maximum charging voltage;
   and wherein the charge-voltage regulator sub-circuit (323, 423) changes its mode of operation from non-voltage-regulating mode to voltage-regulating mode when the voltage charging voltage across the lithium-ion cell or battery (335, 435) reaches the predetermined maximum charging voltage;

further characterized in that
   (e) the transformer (305, 405) is selected to limit secondary winding output current when the charging voltage is greater than the selected minimum charging voltage so that the secondary winding output current will not exceed a selected upper limit for the lithium-ion cell (335, 435);
   (f) the charge-voltage regulator sub-circuit (323, 423) is connected to the rectifier sub-circuit (309, 409) for receiving the rectified secondary winding voltage; and
   (g) wherein when the charge-voltage regulator sub-circuit (323, 423) operates in non-voltage-regulating mode, the charge circuit provides charging current to the cell or battery which is limited by means of the loading effect of the transformer (305, 405).

2. The charging circuit of claim 1, additionally comprising a smoothing sub-circuit (311, 411) connected between the rectifier sub-circuit (309, 409) and the charge-voltage regulator sub-circuit (323, 423) for smoothing the rectified secondary winding voltage supplied to the charge-voltage regulator sub-circuit (323, 423).

3. The charging circuit of claim 2, characterized in that the transformer (305, 405) is selected on the basis that the AC line voltage applied to the primary winding thereof is a predetermined maximum AC line voltage.

4. The charging circuit of claim 1, characterized in that the transformer (305, 405) is selected on the basis that the AC line voltage applied to the primary winding thereof is a predetermined maximum AC line voltage.

5. The charging circuit of claim 1, wherein the transformer is selected on the basis that the AC line voltage applied to the primary winding thereof is a predetermined maximum AC line voltage.

6. The charging circuit of claim 5, wherein the minimum charging voltage is selected to be approximately equal to the average of (1) the initial charging voltage of the lithium-ion cell or when the charging current is held at a constant level equal to the 1.0 C rate for the lithium-ion cell or battery and (2) the predetermined nominal voltage of the lithium-ion cell or battery.

7. The charging circuit of claim 5 for a single lithium-ion cell, wherein the minimum charging voltage is approximately 3.6 volts.

8. The charging circuit of claim 7, wherein the upper current limit is selected to be not greater than the maximum rate for the lithium-ion cell or battery specified by the manufacturer of the lithium-ion cell or battery.

9. The charging circuit of claim 5, wherein the upper current limit is selected to be not less than the 0.5 C rate nor greater than the 1.0 C rate for the lithium-ion cell or battery.

10. The charging circuit of claim 5, wherein the upper current limit is selected to be approximately the 1.0 C rate for the lithium-ion cell or battery.

11. The charging circuit of claim 5, wherein the charge voltage regulator sub-circuit comprises a selected suitable charge-control IC device whose input terminal is connected to the positive output terminal of the rectifier sub-circuit, and whose output terminal is connected to the positive terminal of the lithium-ion cell or battery to be charged, and whose ground terminal is connected to the negative terminal of the rectifier sub-circuit and to the negative terminal of the lithium-ion cell or battery to be charged.

12. The charging circuit of claim 11, wherein the charge control IC device is of the low drop-out voltage type.

13. The charging circuit of claim 5, wherein the charge voltage regulator sub-circuit comprises a selected suitable charge-control IC device whose input terminal is connected to the positive output terminal of the rectifier sub-circuit, and whose output terminal is connected to the positive terminal of the lithium-ion cell or battery to be charged, and whose adjustment terminal is connected to one terminal of an adjustable resistor whose other terminal is connected to the negative terminal of the rectifier sub-circuit and to the negative terminal of the lithium-ion cell or battery to be charged, the adjustment terminal also being connected to one terminal of a resistor whose other terminal is connected to the output terminal of the IC device.

14. The charging circuit of claim 13, wherein the charge control IC device is of the low drop-out voltage type.

15. A charging circuit for charging a lithium-ion cell or battery at a charging voltage that varies during the charging of the cell or battery from a selected minimum charging voltage to a predetermined maximum charging voltage, comprising:
(a) a selected suitable transformer for transforming AC line voltage applied to the primary winding thereof to a lower AC secondary winding voltage;
(b) a rectifier sub-circuit connected to the secondary winding of the transformer for rectifying the secondary winding voltage; and
(c) a charge-voltage regulator sub-circuit connected between the rectifier sub-circuit and the lithium-ion cell or battery for receiving the rectified secondary winding voltage and providing an output charging voltage that is limited to the predetermined maximum charging voltage; the charge-voltage regulator sub-circuit being connectable to the lithium-ion cell or battery for charging the lithium-ion cell or battery by applying the output charging voltage across the lithium-ion cell or battery;
wherein
(d) the charging circuit in operation provides charging current to the cell or battery in two successive stages, viz:
(i) a first stage, during which the charge-voltage regulator sub-circuit operates in non-regulating mode thereby to apply output charging voltage across the lithium-ion cell or battery at a value below the predetermined maximum charging voltage; and
(ii) a second stage, during which the charge-voltage regulator sub-circuit operates in a voltage-regulating mode thereby to apply output charging voltage across the lithium-ion cell or battery at a value limited to the predetermined maximum charging voltage;
(e) wherein the charge-voltage regulator sub-circuit changes its mode of operation from non-voltage-regulating mode to voltage-regulating mode when the voltage charging voltage across the lithium-ion cell or battery reaches the predetermined maximum charging voltage;
(f) the transformer is selected to limit secondary winding output current when the charging voltage is greater than the selected minimum charging voltage so that the secondary winding output current will not exceed a selected upper limit for the lithium-ion;
(g) the charge-voltage regulator sub-circuit is connected to the rectifier sub-circuit for receiving the rectified secondary winding voltage;
(h) when the charge-voltage regulator sub-circuit operates in non-voltage-regulating mode, the charge circuit provides charging current to the cell or battery that is limited by means of the loading effect of the transformer; and
(i) the minimum charging voltage is selected to be less than the predetermined nominal voltage of the lithium-ion cell or battery and greater than the initial charging voltage of the lithium-ion cell or battery when the charging current is held at a constant level equal to the 1.0 C rate for the lithium-ion cell or battery.

16. The charging circuit of claim 15, additionally comprising a smoothing sub-circuit connected between the rectifier sub-circuit and the charge-voltage regulator sub-circuit for smoothing the rectified secondary winding voltage supplied to the charge-voltage regulator sub-circuit.

17. The charging circuit of claim 16, wherein the smoothing sub-circuit is a smoothing capacitor connected between the positive and negative output terminals of the rectifier sub-circuit so that the rectified secondary winding voltage supplied by the rectifier sub-circuit is applied across the smoothing capacitor.

18. The charging circuit of claim 15, wherein the transformer is selected on the basis that the AC line voltage applied to the primary winding thereof is a predetermined maximum AC line voltage.

19. The charging circuit of claim 18, wherein the minimum charging voltage is selected to be approximately equal to the average of (1) the initial charging voltage of the lithium-ion cell or when the charging current is held at a constant level equal to the 1.0 C rate for the lithium-ion cell or battery and (2) the predetermined nominal voltage of the lithium-ion cell or battery.

20. The charging circuit of claim 18 for a single lithium-ion cell, wherein the minimum charging voltage is approximately 3.6 volts.

21. The charging circuit of claim 18, wherein the upper current limit is selected to be not greater than the maximum rate for the lithium-ion cell or battery specified by the manufacturer of the lithium-ion cell or battery.

22. The charging circuit of claim 18, wherein the upper current limit is selected to be not less than the 0.5 C rate nor greater than the 1.0 C rate for the lithium-ion cell or battery.

23. The charging circuit of claim 18, wherein the upper current limit is selected to be approximately the 1.0 C rate for the lithium-ion cell or battery.

24. The charging circuit of claim 18, wherein the connection between the negative output terminal of the rectifier sub-circuit and the negative terminal of the lithium-ion cell or battery to be charged is a direct ohmic connection, and the connection between the positive output terminal of the rectifier sub-circuit and the input terminal of the charge-control IC device is a direct ohmic connection.

25. The charging circuit of claim 16, wherein the transformer is selected on the basis that the AC line voltage applied to the primary winding thereof is a predetermined maximum AC line voltage.

26. The charging circuit of claim 15, wherein the charge voltage regulator sub-circuit comprises a selected suitable charge-control IC device whose input terminal is connected to the positive output terminal of the rectifier sub-circuit, and whose output terminal is connected to the positive terminal of the lithium-ion cell or battery to be charged, and whose ground terminal is connected to the negative terminal of the rectifier sub-circuit and to the negative terminal of the lithium-ion cell or battery to be charged.

27. The charging circuit of claim 26, wherein the charge control IC device is of the low drop-out voltage type.

28. The charging circuit of claim 15, wherein the charge voltage regulator sub-circuit comprises a selected suitable charge-control IC device whose input terminal is connected to the positive output terminal of the rectifier sub-circuit, and whose output terminal is connected to the positive terminal of the lithium-ion cell or battery to be charged, and whose adjustment terminal is connected to one terminal of an adjustable resistor whose other terminal is connected to the negative terminal of the rectifier sub-circuit and to the negative terminal of the lithium-ion cell or battery to be charged, the adjustment terminal also being connected to one terminal of a resistor whose other terminal is connected to the output terminal of the IC device.

29. The charging circuit of claim 28, wherein the charge control IC device is of the low drop-out voltage type.

* * * * *